United States Patent
Seazholtz et al.

(10) Patent No.: US 6,424,636 B1
(45) Date of Patent: *Jul. 23, 2002

(54) VARIABLE RATE AND VARIABLE MODE TRANSMISSION SYSTEM

(75) Inventors: John W. Seazholtz, Great Falls; Wendell N. Sims, Woodford; Kamran Sistanizadeh, Arlington, all of VA (US)

(73) Assignee: Bell Atlantic Network Services, Inc., Arlington, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 09/562,674

(22) Filed: May 1, 2000

Related U.S. Application Data

(63) Continuation of application No. 09/090,421, filed on Jun. 4, 1998, now Pat. No. 6,246,695, which is a continuation of application No. 08/494,082, filed on Jun. 21, 1995, now Pat. No. 5,812,786.

(51) Int. Cl.[7] ................................................ H04L 5/14
(52) U.S. Cl. ...................... 370/295; 370/468; 370/480; 370/493; 375/222
(58) Field of Search ................................ 370/276, 295, 370/465, 468, 480, 492, 466, 467, 478, 481, 482, 485, 486, 487, 493, 494, 495; 375/222

(56) References Cited

U.S. PATENT DOCUMENTS

| | | | |
|---|---|---|---|
| 4,494,138 A | | 1/1985 | Shimp |
| 4,606,044 A | * | 8/1986 | Kudo .......................... 375/222 |
| 4,731,816 A | | 3/1988 | Hughes-Hartogs |
| 5,023,869 A | | 6/1991 | Grover et al. |
| 5,327,423 A | | 7/1994 | Audouin et al. |
| 5,400,322 A | | 3/1995 | Hunt et al. |
| 5,408,260 A | | 4/1995 | Arnon |
| 5,448,560 A | | 9/1995 | Chen et al. |
| 5,461,616 A | | 10/1995 | Suzuki |
| 5,479,447 A | | 12/1995 | Chow et al. |
| 5,488,412 A | | 1/1996 | Maheti et al. |
| 5,519,731 A | | 5/1996 | Cioffi |
| 5,586,121 A | | 12/1996 | Moura et al. |
| 5,594,491 A | | 1/1997 | Hodge et al. |
| 5,610,922 A | | 3/1997 | Balatoni |
| 5,625,405 A | | 4/1997 | DuLac et al. |
| 5,673,290 A | | 9/1997 | Cioffi |
| 5,691,718 A | * | 11/1997 | Balatoni et al. ............ 341/126 |
| 5,732,078 A | | 3/1998 | Arango |
| 5,756,280 A | | 5/1998 | Soora et al. |
| 5,768,279 A | | 6/1998 | Barn et al. |
| 5,812,786 A | | 9/1998 | Seazholtz et al. |
| 5,883,941 A | | 3/1999 | Akers |
| 5,909,445 A | | 6/1999 | Schneider |

OTHER PUBLICATIONS

"Detailed DMT Transmitter Description for ADSL", by Cioffi et al, Amati Communications Corporation, Apr. 12, 1993, pp. 1–4.

(List continued on next page.)

*Primary Examiner*—Ricky Ngo
(74) *Attorney, Agent, or Firm*—McDermott, Will & Emery

(57) ABSTRACT

A public switched telephone network (PSTN) provides communication of digital data from a data provider or LAN to one or more of a plurality of subscriber premises. Asymmetrical digital subscriber line interface units operating at variable rates and in variable modes (ADSL/AVRs) over a local loop offer one-way video-on-demand and other services and carry the necessary signalling between the subscribers and information providers. In an asymmetric mode, the interface units frequency multiplex digital information with voice information to the subscriber and support transmission of a reverse control channel from the subscriber to the central office for transmission back to the information provider. Other modes are supported which permit selective bi-directional and reversible communications as well.

77 Claims, 8 Drawing Sheets

OTHER PUBLICATIONS

"DMT Specification Overview for ADSL", by Cioffi et al., Amati Communications Corporation, Apr. 15, 1993, pp. 1–12.

"The Flexibility of the DMT Frame Structure to Support a Variety of Channelization Option; with proposed Text Changes of Section 5 of the ADSL Draft Standard", by Gooch et al., Amati Communications Corporation and Northern Telecom, Ltd., Feb. 14, 1994, pp. 1–10.

"Very High–rate Asymmectric Digital Subscriber Lines (VADLS)", by Sistanizadeh et al., Bell Atlantic Network Services, Inc., Mar. 8–11, 1993, pp. 1–4.

"QAM: An Appropriate Format for ADSL", Reliance COMM/TEC, Mar. 8, 1993, pp. 1–4.

"ADSL Characteristics", by Starr, Ameritech Services, Mar. 8–11, 1993.

"ADSL Duplex Channel Structure", by Starr, Ameritech Services, Apr. 15, 1993.

"Revisiting Recommended DMT Line Code", by Cioffi, Amati Communications Corporation, Mar. 8, 1993, pp. 1–15.

"Discussion of Default Rate Negotiation (93–314)", by Cioffi, Amati Communications Corporation, Nov. 15, 1993, pp. 1–5.

The Importance of Service Flexibility to ADSL, by Hollbach, Northern Telecom Inc., Dec. 1–3, 1992, pp. 1–4.

"Topology and Protocol for Brandwidth–on–Demand ADSL", by Maxwell, Amati Communications Corporation, Aug. 18, 1992, pp. 1–5.

International Telecommunication Union (CCITT) "Data Communication Over the Telephone Network: A Duplex Modem Operating at Data Signalling Rates of Up to 14 400 bits/s for Use on the General Switched telephone Network and on Leased Point–toPoint2–Wire Telephone–type Circuits", 1991, Recommendation V.32 bis.

"A Programmable Protocol for ADSL Transceivers" by Cioffi et al., T1E1.4/92–076, May 18, 1992.

"A DMT Proposal for ADSL Transceiver Interfaces" by Cioffi et al., T1E1.4/92–174, August 20, 1992.

"Discussion of Default Rate Negotiation", by Cioffi, Amati Communications Corporation, Nov. 15, 1993.

"Network and Customer Installation Interfaces: Asymmetric Digital Subscriber Line (ADSL) Metallic Interface", T1E1.4/94/007R7.

Marshall, Standards Project for Interfaces Relating to Carrier to Customer Connection Asymmetric of Digital Subscriber Line (ADSL) Equipment, "Asymmetric Digital Subscriber Line (ADSL) Working Draft Standard", T1E1.4/93–007, Nov. 15, 1993.

Grover & Krzymien "Simulation of Experimental Studies on the Concept of a Rate–Adaptive Digital Subscriber Loop", IEEE Journal on Selected Areas in Communications, vol. 9, No. 6, Aug. 1991, pp. 941–950.

AT&T Paradyne Advanced Transmission Technologies Business Unit "Adaptive Variable Rate DSL Transceiver," Jul. 28, 1994.

"Asymmetric Digital Subscriber Line (ADSL) Working Draft Standard", by Marshall, T1E1.4 Technical Subcommittee Working Group, Feb. 14, 1994.

"Discussion of Default Rate Negotiation", by Cioffi, T1E1.4 (93–314) ADSL, Nov. 1993, pp. 1–5.

"Topology and Protocol for Bandwidth–on–Demand ADSL" by Maxwell, Amati Communications Corporation, Aug. 18, 1992.

* cited by examiner

VARIABLE RATE AND VARIABLE MODE TRANSMISSION SYSTEM

This application is a Continuation of application Ser. No. 09/090,421 filed Jun. 4, 1998 and now U.S. Pat. No. 6,246,695, which is a continuation of application Ser. No. 08/494,082 filed Jun. 21, 1995 and now U.S. Pat. No. 5,812,786.

TECHNICAL FIELD OF THE INVENTION

The invention relates to a transmission system for transmitting video or other information over a network, and more particularly to a transmission system for efficiently, selectively and interactively transmitting video and other information over a single twisted copper wire pair in the Public Switched Telephone Network (PSTN) at a variable rate or in a variable mode.

BACKGROUND OF THE RELATED ART

It has recently become possible to provide wired transmission of full-motion digitized video programming, rather than still frame or limited video conferencing, without the use of dedicated leased, wide bandwidth circuits and T1 lines. In particular, it has become possible to provide for the cost effective routing and distribution of a large amount of video or other data at high speed and in real time using the existing copper plant. For example, U.S. Pat. Nos. 5,341,474 and 5,371,532 to Gelman et al discuss a "store-and-forward" architecture and method for distributing information to subscribers and U.S. Pat. No. 5,247,347, issued to L. Litteral et al on Sep. 21, 1993 and assigned to the assignee of the present invention, discusses a method of providing video-on-demand (VOD) services with VCR type functional control of the programming.

In the systems discussed in these three patents, a menu of programming information is accessible at the subscriber's premises. The subscriber may transmit order requests via the PSTN to the independent information providers. Information programs may be accessed and transmitted to the subscriber directly from an information provider or through a video buffer located at a central office (CO) serving the subscriber.

The information provider transmits coded digital data over wideband PSTN to a central office. The data may be buffered at the central office for transmission over a POTS (plain old telephone service) line to the subscriber using a video gateway. An access concentrator/packet switch at the central office receives the order request from the subscriber loop. A video gateway in turn is responsive to the order request for producing routing data. A file server, responsive to requests received from the video gateway, obtains selected information from the digital information storage medium. A circuit or ATM cross-connect switch in turn is responsive to the routing data for transferring the information from the file server to the subscriber loop transmission means.

A subscriber in such a system may use either a standard telephone instrument over the PSTN or a dedicated control device over an X.25/ISDN packet network to order the information program. The dedicated control device is either a settop box which is located at a television set of the subscriber and which permits a display of the program menu on the television screen or a computer with appropriate control boards.

Connectivity between the central office and the subscriber for transmission of data is provided by one of a number of different interface units, such as an asymmetrical digital subscriber line (ADSL) interface or a high bit rate digital subscriber line (HDSL) interface. ADSL systems are generally preferable to bi-directional HDSL systems for services such as video-on-demand in which the amount of information transmitted in one direction is much greater than the amount of information transmitted in the opposite direction. ADSL systems provide a cost effective and bandwidth efficient platform for receiving or transmitting a large volume of information at high speed in a single direction using the existing copper plant. An asymmetrical communication transport provides high bandwidth for fast transfer of bulk data in one direction, while a slow transmission rate is used for bi-directional communication. Typically, a request for data requires very little data transfer in the upstream direction and the data delivery involves high data traffic in the downstream direction. In addition, ADSL systems are generally capable of transmitting over longer distances than HDSL, do not interfere with POTS or ISDN communications and therefore require only a single copper pair.

T1 communication enables simultaneous high speed digital transmission of bulk data in both directions, but requires special wiring and circuitry and exceeds requirements for data network applications in which high bulk data transfer occurs only in one direction at a time. Existing video conferencing transceivers and HDSL systems permit bi-directional transmission at high bit data rates.

The data rates of the channels in conventional ADSL systems are typically predetermined according to the structure of the ADSL interface units. Therefore, although previous systems may be well suited for some services such as video-on-demand, they are not well suited for other services in which the nature and amount of data and control signal transfer is substantially different or changes frequently. Specifically, the two-way control channel may be unacceptably slow for services such as interactive multi-media, distance learning, or accessing a server in a remote local area network (LAN) over a POTS line using a single copper pair. One or more of these services may require a bi-directional control channel of up to, for example, 384 kbps in order to allow substantially real-time communications so that a subscriber is not waiting for information to be transmitted.

Furthermore, systems which provide services such as video-on-demand and home shopping typically only provide for the transfer of video programming or other data in a single direction from a VIP or other information provider to a subscriber. They may not provide significant bi-directional capability, full connectivity amongst all of the subscribers on the network, or multi-cast transmission capability which can be point-to-point or point-to-multipoint for distance learning, video phone etc.

SUMMARY OF THE INVENTION

Accordingly, it is a broad object of the invention to controllably operate in one of a plurality of different modes and at any one of a plurality of different bit rates so as to provide a single transmission platform which may support a plurality of different services, including but not limited to, video on demand and reliable bi-directional communications at data rates greater than 16 kbps.

Another object of the invention is to provide an asymmetrical flow of information wherein the direction of the asymmetrical flow of information can be simply and easily reversed.

Still another object of the invention is to simply and easily vary the bit rates of the upstream and downstream channels, or the modes of the transceivers, of an ADSL network.

Another object is to either automatically control bit rate or mode by the CO or selectively control bit rate or mode by the subscriber.

A further object of the invention is to provide a high speed reversible channel for receiving and sending unidirectional data/video.

Still another object is to provide a truly bi-directional fractional T1 service using a transceiver that transmits only a fractional T1.

It is a further object of the invention to provide a full service information network over the existing copper plant of telephone wires by connecting to a computer network and performing format conversion and multi-cast transmission in real time.

In order to achieve the above objects, this invention adds capabilities to present networks by providing an ADSL having adjustable variable rate functionality (ADSL/AVR). A controllable transceiver in the ADSL/AVR allows the communication rate to be selected from 2×64 KB up to 1.5 Mb/s or 6.2 Mb/s into a digital cross connect system or ATM edge device or switch. Such a network has the advantages of conventional ADSLs, while allowing the data rate of the reverse control signaling channel to be controllably increased so as to have a higher rate transmission than ADSL in a bi-directional mode.

A preferred embodiment of the invention uses a terminating unit which has a T1 interface on one side and a variable rate interface on the other side. A digital cross connect system has at least one 1/1 cross-connect to cross connect T1s and a plurality of 1/0 cross connects to cross connect fractional parts of T1s (DSOs) in order to aggregate or groom services in the backbone network between the 1/0 DCSs and provide more efficient transport across the network.

Other embodiments of the invention use an ATM, Frame Relay, or SMDS network at the central office end. Ethernet interfaces are used to facilitate transport to a personal computer at the remote end and LAN/WAN connections to ATM, Frame Relay, or SMDS switching at the central office end.

This variable rate/variable mode ADSL service will accommodate access to a wide variety of information providers such as the Internet or other data networks through which data from servers are to be retrieved. The service has applicability in various contexts such as telecommuting and banking services. The ADSL service can also be used in an office building LAN or between house pairs.

In addition to variable bit rates for the control channel, the invention enables at least two modes for the ADSL transceivers, one providing bi-directional communications and the other providing asymmetrical communications such as video-on-demand. Each ADSL transceiver is either a discrete multi-tone (DMT), CAP or DWMT transceiver comprising identical programmable chip sets in which different firmware may be downloaded to enable the different rates and different modes.

In accordance with a further aspect of the invention, the transmission bit rate may be asymmetrical in selectively changeable directions so that parties to a communication session can individually exchange bulk data transmission in both directions. The ADSL transceivers may be responsive to a control signal transmitted in the upstream channel which indicates that the direction in which data is transmitted should be reversed.

The above and other objects, features and advantages of the present invention will become apparent from the following description taken in conjunction with the accompanying drawings.

DETAILED DESCRIPTION OF THE PREFERRED EMBODIMENTS

Figure 1:
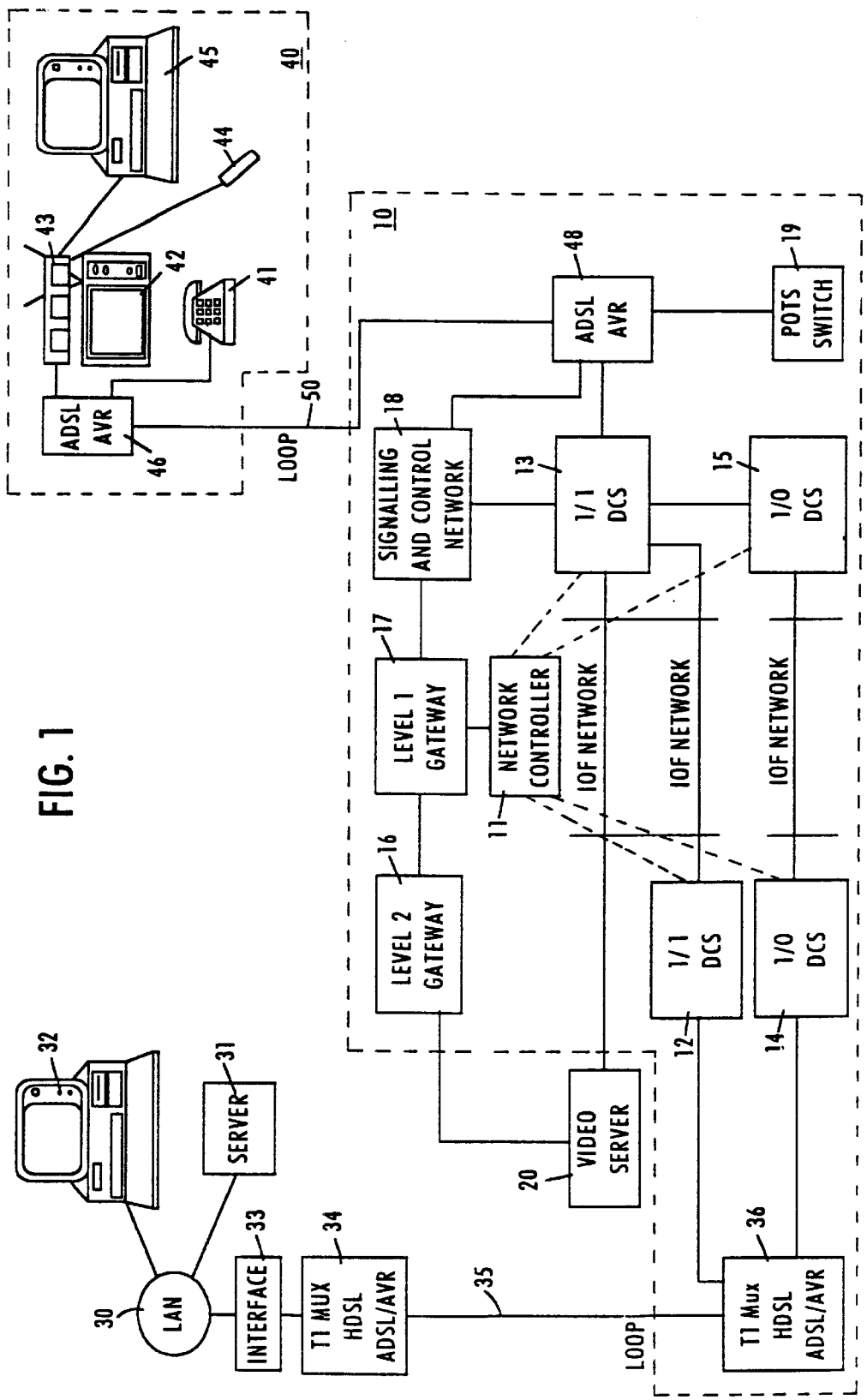
FIG. 1 is a system diagram of a first preferred embodiment of the invention showing connection between a video server, a local area network and a single subscriber through a digital cross connect and two ADSL/AVRs.

A first preferred embodiment of the invention shown in FIG. 1 utilizes existing components of the Public Switched Telephone Network (PSTN) to access video programs from a video server 20 in a video-on-demand service or data through a private local area network (LAN) 30. The switching facilities are located in a central office (CO) 10 serving residential customers or other subscribers. Loop electronic devices modify the transmission characteristics of the local copper loop as necessary to provide required enhancements to the PSTN and/or permit high bit rate delivery of full motion video or other information.

Video Server 20 implements compression techniques to store video and other information for subsequent forwarding over interoffice facilities in a video-on-demand service, such as that disclosed in U.S. Pat. No. 5,247,347 and hereby incorporated by reference, in which analog video information is first converted to a digital format using standard encoding techniques such as MPEG.

Video server 20 may also process information and serve information other than video information, such as still pictures, audio, interactive video, including interactive learning, interactive games, and other presentations sometimes termed "multi-media." The server may also store and process all data required for video file and other media applications including text, still pictures, audio, and partial and full motion video, as well as interactive application scripts.

In addition to storing pre-encoded video file information, video server 20 may also accept live video feeds and other media file programming from other servers for later transmission or for real-time and multi-pass encoding in an encoder (not shown). Real-time encoding is used to provide encoded high bandwidth signals, such as full motion live-action video, in real time while minimizing network transmission requirements and providing a signal compatible with ADSL connectivity to subscriber premises 40. Multi-pass encoding performed by the file servers provides a higher quality video signal for storage and later transmission over the network to subscriber premises 40 than is possible with single-pass encoding.

The network control software of the server in combination with management resources of the PSTN control the "network session" between an output controller of the file server, external program providers, and user ports. An associated session manager also maintains a record of relevant data regarding each session which is forwarded to a customer billing system. Video and other media file data from the server are provided to the CO and selectively supplied to subscribers under control of network controller 11, level 2 gateway 16, level 1 gateway 17, and signalling and control network 18.

A control server (not shown) in video server 20 keeps track of all information, and routes the movies and other video programs to subscribers at an appropriate port through a high bandwidth interface. The control server has a large number of ports, each port controlling a single transmission to one or more subscribers sharing the session (viewing a movie). The state of each port is known by a table stored in the control server.

Upon receipt of an order from the level 2 gateway 16, the control server bundles the order with other identical orders received recently, and assigns a port based on the states read from the table. For example, a particular port will be reserved for all subscribers placing the same order within the next five minutes. Conversion between the telephone number of the subscriber and frame address for establishing a physical connection through the DCS is carried out by a look-up table in a data base of the level 2 gateway 16. Level 2 gateway 16 may be implemented by any one of number of different available equipment suitable for that purpose including, but not limited to, a IBM RISC 6000 computer supplied with catalog information of the files available from video server 20.

The file server processes all requests from the gateway to provide video file and video file feeds to customer premises via the CO and ADSL/AVR interfaces. The file servers perform input of video and other information files, store these files or pass real-time data through to subscriber premises 40, monitor and record user sessions, process interactive control requests from users, and control outputs to the users. A session supervisor manages all program sessions including system access by subscribers, other video file users and input and output to, from and through the file server by multi-file information providers. The session supervisor tracks and records all data considered pertinent to a user's session including output port, input port, file address, file index data, file frame data, and sessions condition. The session supervisor also performs network resource optimization by the simultaneous broadcast of the same file over one output port to multiple subscribers. However, each subscriber session is individually managed to permit interactive features such as video pause.

A session trace processor tracks each subscriber's session based on file and frame so that the execution of a pause sequence can be managed for each individual session. A subscriber may start viewing a file individually or as part of a larger group. Selection of a pause function places the subscriber "out of sync" with the rest of the group and, hence, requires establishment of a separate session for that user and causes level 2 gateway 16 to establish a new network link to the subscriber's viewing location. Although each user is assigned an individual logical session, sessions in sync with one another can share output and network facilities.

Dial-up access to video server 20 is provided by a voice switch which establishes connectivity with a voice recognition unit (VRU) which answers the incoming call and prompts the subscriber for a user ID which is input via the DTMF pad of a telephone. The user ID is checked and, if valid, the VRU prompts for a selection. The selection is then input using the DTMF pad of the telephone which then sends the selection information to the file server via the level 1 gateway and level 2 gateway. The file server identifies the requested file and determines if the file is available and notes any viewer restrictions.

If the file is found, is not restricted from the requester and has not been previously queued for transmission, it is opened and a reserve idle communications port is identified for transmission of the data to the CO. Transmission of the data is delayed for a predetermined number of minutes in response to a first request to allow for simultaneous transmission of the data file to subsequent subscribers placing an order within the delay period. The subsequent request orders are also placed in the queue and the associated communications port ID is matched to the subscriber's network address.

After expiration of the predetermined delay, i.e., when current time equals the designated start time, the data file is transmitted from file server through the DCS to the designated ADSL/AVRs for transmission to subscriber premises 40. At the end of the program, a message is transmitted by the server to network controller 11 to take the system down by terminating DCS connectivity.

A standard local area network (LAN) 30 such as an Ethernet LAN with associated file server 31 and workstation 32 provides and receives data through a router (not shown) and LAN interface unit 33. A T1 MUX, HDSL or an ADSL/AVR interface 34 connects the LAN to a T1 MUX, HDSL or an ADSL/AVR interface 36 in CO 10 in any one of three corresponding modes via local loop 35. The HDSL interface may contain multiple fractional T1 interfaces (not shown) which utilize different portions of the T1/E1 bandwidth may also be used to provide connectivity with the central office. Furthermore, some form of fiber extension may be utilized in local loop 35, to provide reliable over distances of more than about 1.5 kilo-feet from central office 10 (see, e.g., U.S. patent application Ser. No. 08/233,579, in the name of Bruce Kostreski, filed Apr. 26, 1994, and entitled "Extended Range Video On Demand System"). In the illustrated network, the connection is a wired ADSL loop.

The subscriber's premises 40 are preferably provided with a telephone 41, television 42, set top box 43, remote control unit 44 and personal computer 45. Although a personal computer is illustrated, any user station which processes data may be used by the subscriber and connected to the network. Remote control 44 can be a conventional infrared remote control for sending commands to, and otherwise interacting with, set top box 43. Data from set top box 43 is provided to the subscriber side ADSL/AVR 46 or, although not shown, to a decoder for transmission of command data to ISDN D-channel or X.25 interface. The set top box 43 can provide subscriber order information directly to level 2 gateway 16 in lieu of a voice response unit. The ADSL/AVR interface 46 preferably contains a toggle switch which can control the direction of an incoming and outgoing signals to either the set top box 43 or personal computer 45.

The subscriber's premises are connected to CO 10 via subscriber side ADSL/AVR unit 46, CO side ADSL/AVR unit 48 and local subscriber loop 50. The ADSL/AVR units are similar to each other in structure and constitute an improvement over conventional ADSL units as described in detail below. Again, some form of fiber extension may be utilized in local subscriber loop 50, to provide reliable connections over distances of more than about 1.5 kilo-feet from central office 10 (see, e.g., U.S. patent application Ser. No. 08/233,579, in the name of Bruce Kostreski, filed Apr. 26, 1994, and entitled "Extended Range Video On Demand System"). In the illustrated network, connection 50 is a wired ADSL loop.

Once gateway 16 identifies a subscriber request to establish connectivity between the subscriber and video server 20, the address of control unit 44 is provided to the video server. Upon receipt of the corresponding network address by control unit 43, direct connectivity is established between control unit 43 and video server 20 over packet data network 50. This connectivity permits direct data transfer between the customer premises and the associated VIP to support interactive video control used in interactive educational programming and interactive video presentations such as video games. Control unit 43 provides user interactive control of the buffered video data.

Plain old telephone service (POTS) is separately provided to the subscriber in a conventional manner through POTS switch 19 and ADSL/AVR interface 48 so that if the power goes out, the telephone service still works. The operations of establishing and monitoring connections linking the video server 20 and LAN 30 with subscriber's premises 40 receiving and sending information is performed by a supervisory network controller 11 which controls electronic digital cross-connect switches 12, 13, 14 and 15 that reside in CO 10. The network controller preferably establishes a path to the loop transport system based on a predetermined set of options. This allows for video or demand as well as other high bit rate data communications over the ADSL/AVR interface units. If symmetrical, the 1/0 cross connect is used. With specific instructions to set up and tear down the connection as required, the 1/0 controller provides router functionality. An example of a suitable network controller is a network management software package such as the Mega-Hub BASiS™ Controller by Digital Switch Corporation.

Switching of the downstream T1 rate traffic may be effected through suitable cross connect circuit switches such as the Digital Access and Cross-connect System (DACS) by AT&T or the Dexes product by Digital Switch Corporation placed between the hub and the ADSL/AVR unit. Switching may also be effected through packet switching. Each of the 1/1 DCS's 12 and 13 are two-way T1 capable and adapted to provide bridging or broadcasting of video or other information to several subscribers. The multiplexing of fractional T1s in each of the 1/0 DCS's 14 and 15 is controlled by network controller 11 and is carried out when less than an entire DS1 is to be transmitted through the inter office network (IOF) if it can be combined with other fractional services and pumped over the network as full groups of T1. Fractional HDSL transmission systems with multiple fractional T1 interfaces to utilize different portions of the T1/E1 bandwidth may also be used to provide connectivity between the central office and the subscriber.

Although a single user is shown in FIG. 1, it should be understood that there may be a large number of users in the network, each one having an ADSL/AVR interface connected to one of a plurality of ADSL/AVR interface units within the CO. The ADSL/AVR interface units at the central office may be shared by multiple users using a network management system. (Alternatively, the CO may have a router with ADSL functionality built in.) In that case, each of the channels can be combined with others in the 1/0 DCS 15 serving the homes or the 1/0 DCS 14 on the LAN end and thereby connected to the LAN over a single T1 link. Once connection to the LAN is established, the network capabilities are used to combine fractional T1s with others to get economies across the network directed to the LAN. Alternatively, a bandwidth manager may be provided for grooming the data from adjusting multi-rate services above the DSO level for individual customers.

Figure 3:
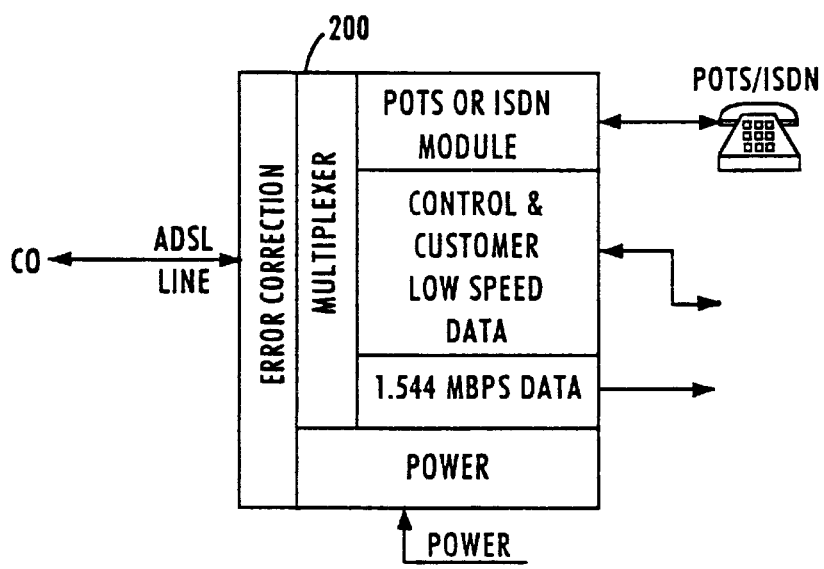
FIG. 3 is a functional diagram of a conventional asymmetrical digital subscriber line unit (ADSL).
Figure 6:
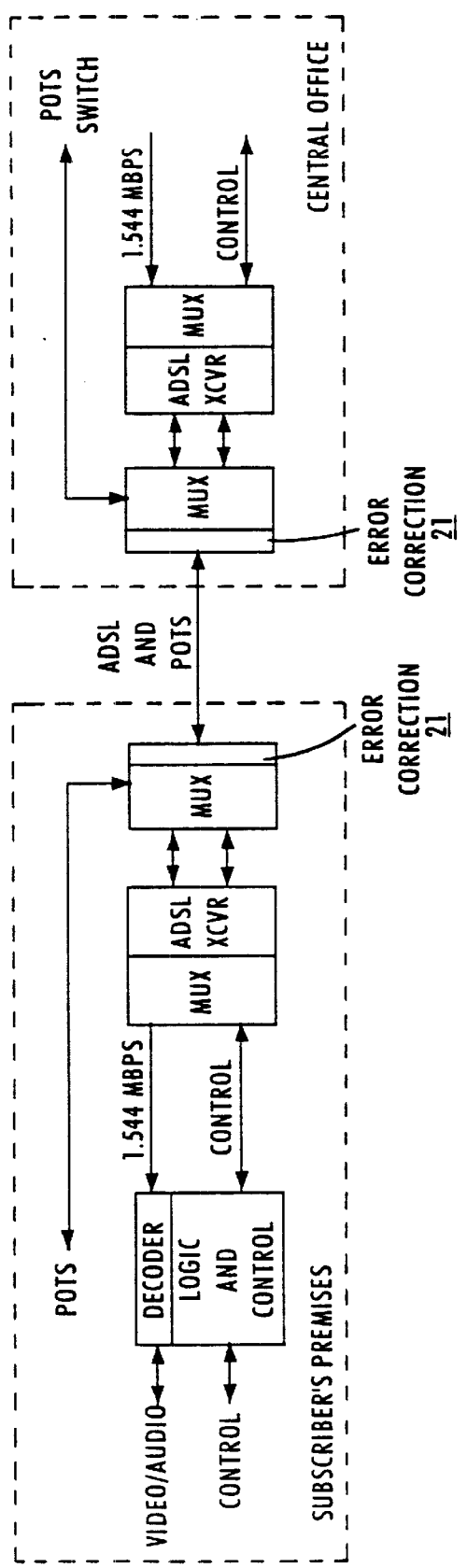
FIG. 6 is a hardware block diagram of the conventional ADSL of FIG. 3 configured to provide simplex high-bit-rate access and POTS on a common copper loop.

The ADSL/AVR's used in the present invention are a modification of, and an improvement over, conventional ADSL units such as those shown in FIGS. 3 and 6. Conventional ADSL units carry out error correction and multiplex (i) voice and signaling information and (ii) digital video or other information on subscriber loop 50 using frequency multiplexing to divide the available loop bandwidth into three channels 302, 304 and 306 (see FIG. 4), including a large (i.e., 1.544 Mbps) one-way data channel downstream to the subscriber and a small (i.e., 16 or 64 kbps) two-way reverse control channel upstream on the ISDN packet data network between the subscriber and the central office.

Base band audio and signaling below 4 kilohertz (kHz) provide connectivity for conventional telephone services available on the "plain old telephone system" (POTS). Alternatively, ISDN channel requirements could consume the bottom 80 kHz of loop bandwidth. Reverse channel digital packet information, centered on 95 kHz, provides 8 kilobits per second (kbps) of handshaking protocol between the customer- and trunk-side ADSLs to test the copper pair transmission path, and approximately 16–64 kbps connectivity from the subscriber premises to a packet switched network, such as the ISDN network over a D-channel interface. The 16 or 64 kbps signal is stripped by the ADSL and sent to the CO 10. Compressed digital video or other information is contained within the frequency range of about 100 and 500 kHz to provide a 1.6 mbps channel for transporting video/audio data over loop 50 to customer premises 40.

Figure 4:
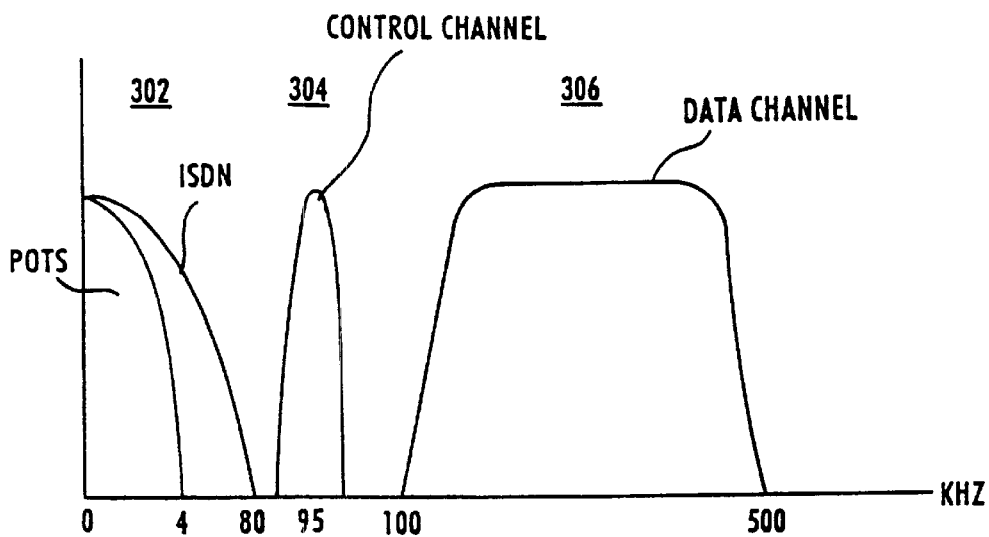
FIG. 4 is a frequency domain diagram showing the preset channelization of a local loop in a system using the conventional ADSL of FIG. 3.

The frequency channel represented by range 302 in FIG. 4 thus establishes a 2-way channel used to provide standard POTS service or ISDN (2B+D) service over the ADSL line. Channel 304 is an up-stream only (subscriber to CO), low speed data channel. Eight kbps of this channel is used for transfer of operations, administration, maintenance, and provisioning (OAM&P) data for the ADSL unit. The remaining 16 or 64 kbps, compatible with D channel interfaces of BRI-ISDN, or with X.25 protocol, is used to interface with an ISDN or X.25 packet switch for allowing the subscriber to interact with the network and/or the 1.544 mbps signal provider. It may be used for e-mail or and/or data requests.

Channel 306 carries a down-stream only (CO to subscriber) digital signal providing 1.544 mbps transport for carrying the information signal over the same twisted pair. The lower edge of channel 306 is set at or about 100 kHz., chosen to minimize channel loss and allow appropriate bandwidth for base band channel 302 and reverse channel 304 and to minimize interference from impulse noise. The combined digital down-stream signal utilizes the DS1 bit map specified by ANSIT1.403-1989.

A down-stream control signal to the subscriber (not shown in FIG. 4) is time division multiplexed with the 1.544 mbps video signal on the 100–500 Hz carrier. This down-stream control signal, together with the digitized information and overhead, occupies a bit rate band of about 1.6 mbps. All necessary multiplexing and demultiplexing of the telephone service, control and video information signals in the frequency and time domains are carried out by the ADSL units.

Because data channels 304 and 306 are unidirectional, the system does not experience self-NEXT (near end crosstalk). This allows concentration on the interface and interference from impulse noise because the ADSL system is loss-limited rather than NEXT limited. Impulse noise exposure can be reduced by using a pass band technique as opposed to a base band approach since impulse noise effects are greatest below 40 kHz. Therefore, a modulation technique such as base band Quadrature Amplitude Modulation (QAM), Carrierless Amplitude/Phase Modulation (CAP) or discrete multitone (DMT) is preferred over a 2B1Q base band system.

Multiplexer 200 shown in FIG. 3, in combination with an ADSL line, supports transmission of a one-way 1.544 mbps digital data signal and a two-way 16 or 64 kbps control signal along with a POTS or a BRI-ISDN signal over a single non-loaded copper pair. The ADSL transported signal is demultiplexed, and the 1.544 portion can either be decoded by a conventional decoder in a set top box using MPEG standard techniques to deliver a full motion video signal or passed through to a personal computer. Multiplexer 200 also supports the Ethernet interface for direct connection to personal computer 45.

This configuration provides service to a customer over copper loop lengths of up to 18,000 feet, conforming with Carrier Serving Area (CSA) and resistance design rules. Alternatively, transport may take place over a radio frequency link or using cellular transmission. The signalling bands may all be transported on the same medium, or may be mixed. For example, telephone service signals may be transmitted on copper wires, and the control and video signals by radio frequency. For brevity, ADSL units operating only in a transport environment of twisted wire will be described hereinafter.

Figure 5:
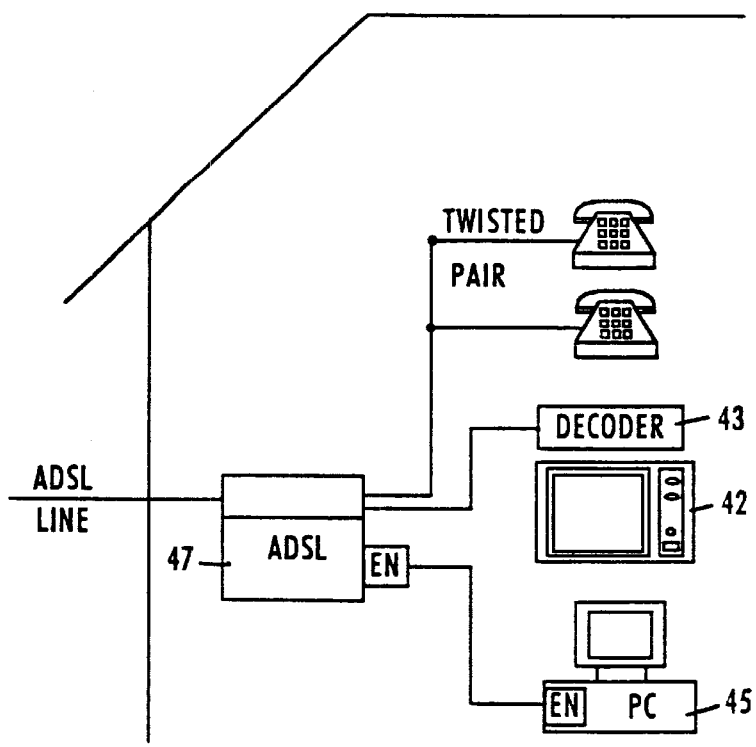
FIG. 5 shows a typical in-the-home configuration providing video transported over a 1.544 MBPS channel overlaid with standard telephone service signaling in the system using the conventional ADSL of FIG. 3.

FIG. 5 shows a preferred in-the-home configuration which provides either video or data transported over the 1.544 mbps channel. The ADSL interface 47 preferably provides outputs on three twisted wire pairs. One pair goes to standard telephone equipment. Another pair provides video data to set top box 43 to be displayed on television 42. A third pair or coaxial cable provides data directly to the Ethernet card of personal computer 45.

The unidirectional 1.544 mbps video signal carried by the ADSL system has either a Superframe Format (SF) or an Extended Superframe format (ESF). The Superframe format consists of 24 consecutive 8-bit words preceded by one bit, called the framing bit (F-bit), for a total of 193 bits per frame. The F-bit is time-shared to synchronize the ADSL interface equipment and to identify signaling framing. Twelve consecutive frames form a Superframe. A line code used with a Superframe format is bi-polar return-to-zero, also known as Alternate Mark Inversion (AMI).

The ESF format consists of 24 consecutive frames, each of which includes 192 information bits preceded by 1F-bit for a total of 193 bits per frame. The F-bit is used for basic frame synchronization, a cyclic redundancy check and a data link. Twenty-four frames form a Superframe. The line code used with the ESF is either AMI, bi-polar 8-zero substitution (B8ZS), or AMI with Zero-Byte Time Slot Interchange (ZBTSI).

Subscriber and CO ADSL interface units are synchronized to ensure that both subscriber and CO side units derive timing from one master clock to prevent data loss. Preferably, the units derive timing from the incoming 1.544 mbps signal. Subscriber end ADSL equipment is powered locally from the customer premises; CO end ADSL equipment is preferably powered by an external source of DC input voltage in the range of between −42.5 and −55 VDC.

Figure 8:
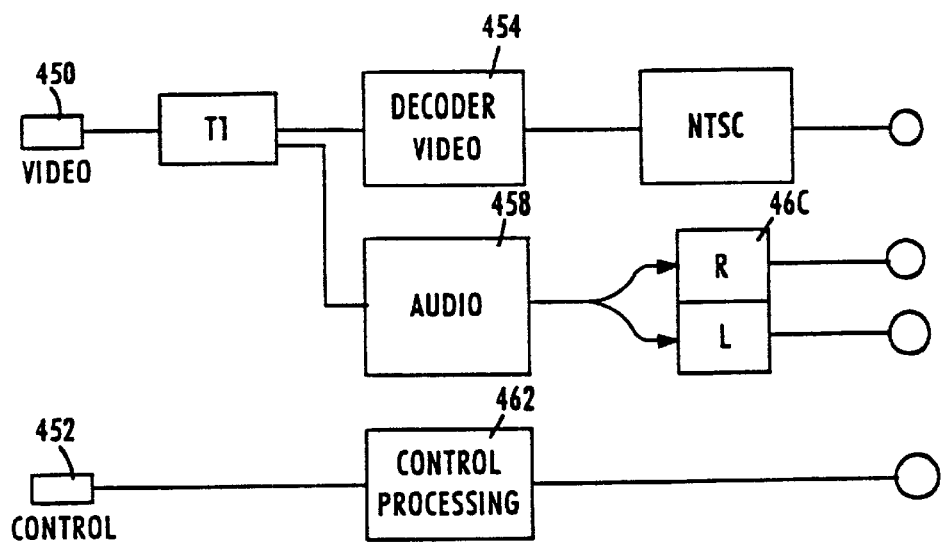
FIG. 8 is a diagram of a conventional video decoder unit resident at the subscriber's premises.

An MPEG decoder, shown in more detail in FIG. 8, includes a T1 input 450 for high speed data, preferably at 1.544 mbps and of DS1 format, and an input 452 for a control signal of bit rate of 16 or 64 kbps. The control signal is applied to known MPEG control processing circuitry 462. The video signal applied to input 450 is decoded by video decoder 454 to produce an NTSC base band signal to be supplied to an output port, as shown, such as an RCA jack. The output signal in turn is applied to the video terminals of a television, preferably within a frequency band corresponding to channel 3 or 4.

The audio component derived from the video signal using conventional signal manipulation is applied to audio processing circuit 458 to attain right and left channel audio components represented by block 460 for supply to a stereo amplifier (not shown). Alternatively, the audio and video components can remain synchronized and be supplied to the television through a conventional RF modulator (not shown). Although not shown in FIG. 8, the front of the enclosure housing the MPEG encoder preferably has an interface for accommodating an infrared remote control unit.

A conventional ADSL system (the hardware block diagram is shown in FIG. 6) may provide simplex high-bit-rate video data and POTS connectivity to a subscriber over a common copper loop with transport capability to deliver a one-way high-bit-rate data stream with POTS or ISDN basic access multiplexed at baseband. Each ADSL on the subscriber- and CO-sides includes an error correction circuit 21 implementing an error correction algorithm, such as the Reed-Solomon algorithm, for correcting errors that arise as a result of transmission of data on a twisted pair of copper lines. The subscriber- and CO-side ADSLs on opposite ends of the twisted copper pair carry out "handshaking" while implementing the algorithm to reduce error in the video signal to a minimum.

A multiplexer residing in the subscriber-side ADSL includes, in addition to a frequency converter for channelizing the incoming signal into 1.544 Mbps, 16 Kbps and 8 Kbps components, a splitter/filter for separating the standard POTS signal from the video composite. Hence, the video component incoming on the twisted copper pair is transparent to a standard phone resident on the line at the usual network interface device (NID).

The splitter/filter and converter may be separate units or may be combined with a converter as a single unit residing outside the ADSL enclosure. Alternatively, the converter and decoder can occupy a common enclosure, and the splitter/filter arranged as part of the NID at the subscriber's premises.

Figure 7:
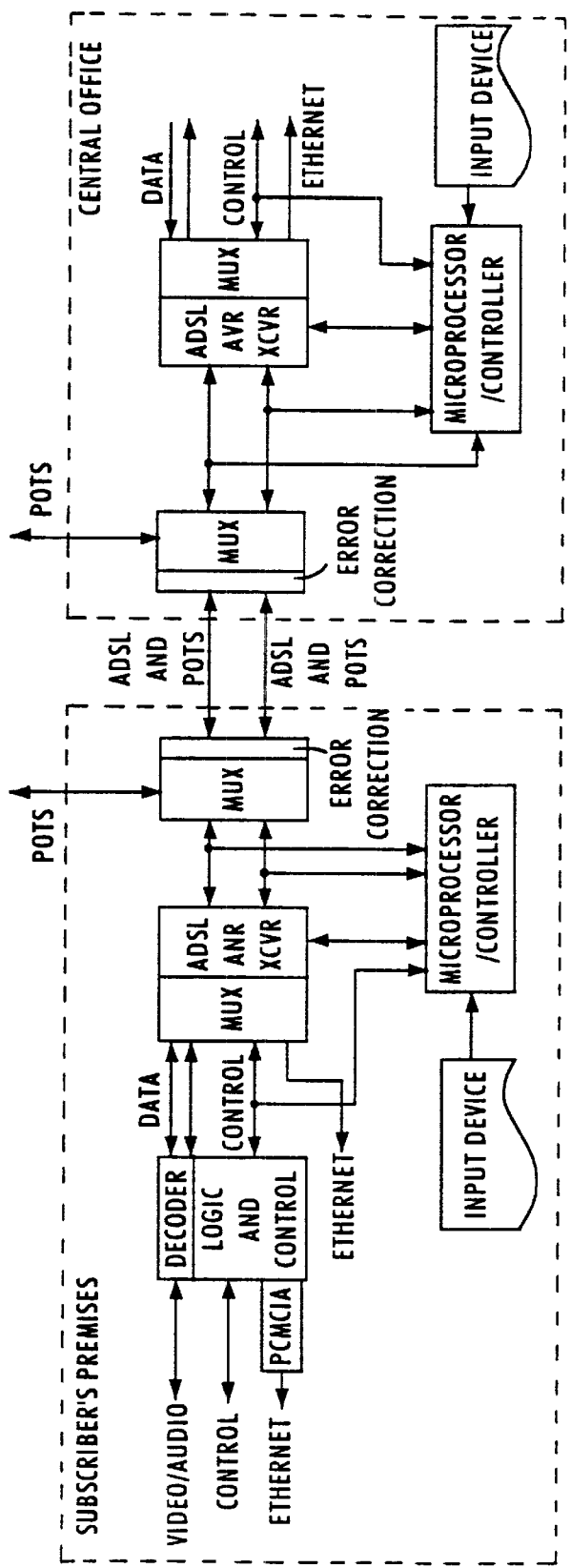
FIG. 7 is a hardware block diagram of a configuration in which an ADSL/AVR is used to provide variable rate and variable mode service on top of POTS on a common copper loop.

A general overview of an exemplary ADSL/AVR system of the present invention is shown in FIG. 7. This system is similar to the conventional system shown in FIG. 6 in some respects. However, the transfer of data in the ADSL/AVR system shown in FIG. 7 is indicated by two arrows pointing in opposite directions in order to illustrate the reversible mode feature of the system and no fixed data rate is given due to the capability of the system to transmit at any one of a number of different transmission rates. The system preferably contains an ADSL/AVR transceiver, a microprocessor/controller (external to and connected to the transceiver), a multiplexer (connected to the transceiver) for separating the data and control signals, an ethernet interface connected to the mulitplexer, a logic and control circuit responsive to control signals, an ethernet interface connected to the logic and control circuit, and an input device connected to the microprocessor/controller, described in more detail below.

Although a preferred network embodiment is shown in FIG. 7, the ADSL/AVR system supports multiple network service applications and multiple data rate services over a single twisted copper wire pair transmission line even if the line has an unknown number of bridged taps. Potential applications include, but are not limited to, access to Internet or any other data networks through which data from servers are to be retrieved, connectivity from wireless PCS cell locations to centralized radio control units, pair gain systems, partial operation (protection switching with diversity routing), work at home LAN connectivity for telecommuters, switched 384 access, and campus or large facility line drivers.

A dedicated microprocessor/controller configures and controls each ADSL/AVR transceiver by loading firmware to set up variable transmission rates, initiating startup, re-start and test modes, monitoring signal quality and energy detect for diagnostic use, and making a decision to change the transmission rate if and when an appropriate option is enabled. The microprocessor/controller may also perform additional functions for which it is adequately programmed. The microprocessor/controller contains memory such as an EEPROM to store the firmware for the multiple data rates and modes, and clock generation components to enable transmission at the frequencies enabled by the multiple data rate firmware. Preferably, the variable transmission rates are controlled by a first plurality of sets of program instructions loaded into a chip set (firmware 1) and the mode of the transceiver is controlled by a second plurality of sets of program instructions loaded into the chip set (firmware 2).

The variable transmission data rates may be pre-designated for a fixed data rate application or may be selected automatically by, for example, an adaptive algorithm to run the maximum data rate supported by transmission line characteristics. Such an adaptive algorithm can ensure that data is always transmitted, albeit it at a low rate. The closer it is to a CO, the higher the bit rate generally will be. If a line degrades because of taps or the like, the ADSL/AVR will drop down in data rate but keep the customer in service. Consequently, a new service can be installed on short notice without concern for transmission line length or line quality.

The use of a common hardware platform and programmable firmware also provides advantages in initial manufacturing and cost, and in product enhancement, upgrade costs, and time to market. For example, a subscriber could receive a fractional T1 service at 384 Kbps using the ADSL/AVR system and then upgrade the capability of the service to higher data rates in the future using a network management system without altering the hardware.

The transmission bandwidth and mode of the ADSL/AVR are also controlled using the microprocessor/controller. Each transceiver can be selectively configured to ensure, for example, that transmission occurs above 10 KHz to enable POTS service when used in appropriate installations or occurs above 80 KHz to enable ISDN in other installations. The microprocessor/controller may also provide additional filtering if a pre-designated or selected variable rate spans across the 784 Kbps rate.

The microprocessor/controller in the preferred embodiment shown in FIG. 7 operates in one of three selectable modes. The first mode is conventional ADSL, which is appropriate for applications in which a subscriber wishes to view video data (using the fixed rate interface) or download a large amount of information in a predetermined downstream direction (utilizing the ethernet interface).

Figure 10:
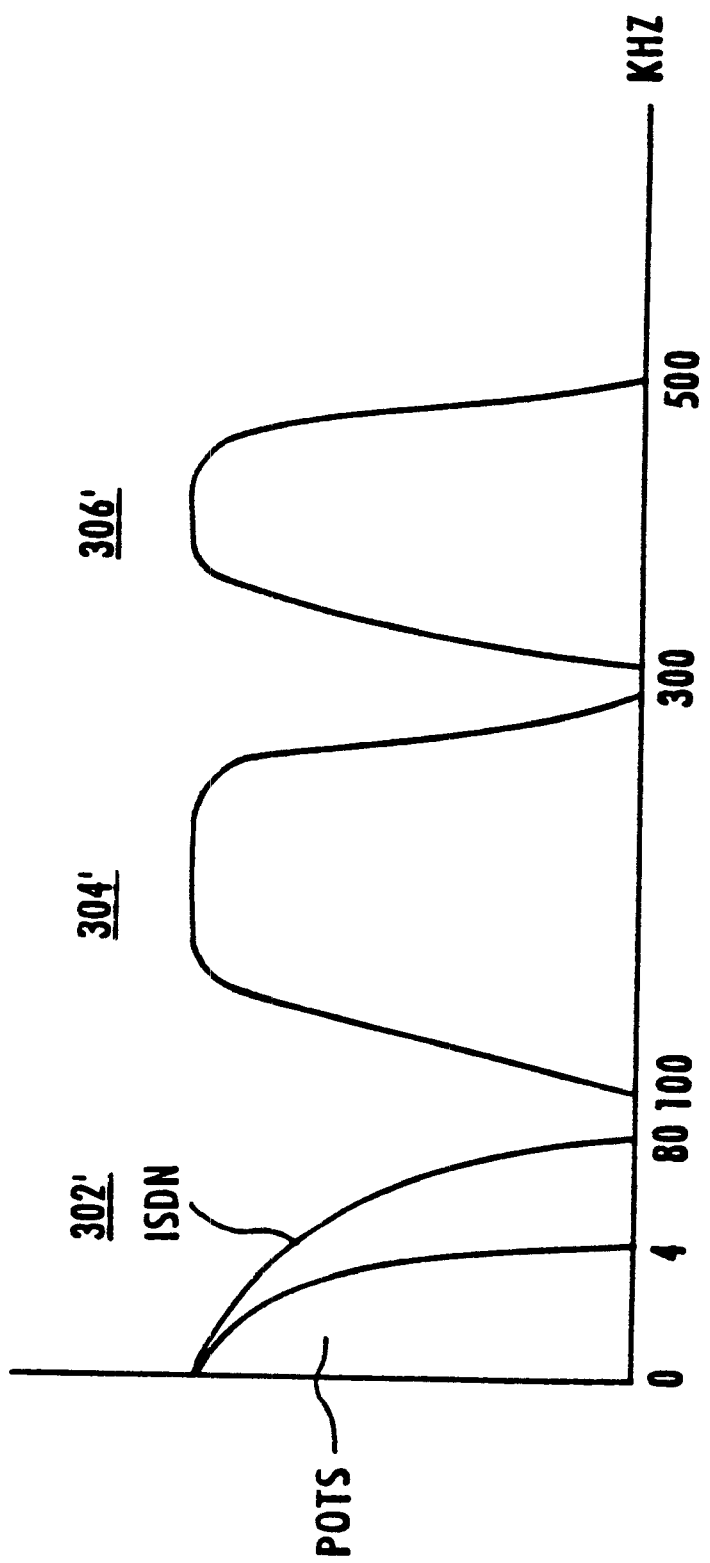
FIG. 10 is a frequency domain diagram showing an example of the possible channelization of a local loop in a system in when the ADSL/AVR transceiver of the present invention is operating in a bi-directional mode.

The second mode is a bi-directional transmission mode which improves upon conventional ADSL by increasing the transmission rate of the upstream channel while decreasing the transmission rate of the downstream channel. This mode is preferable for certain interactive real-time applications such as video games and distance learning, in which a 8 Kbps or 16 Kbps upstream channel is insufficient for the flow of data in the upstream direction. An example of the channelization in the bi-directional mode in which the downstream and upstream channels are roughly equivalent is illustrated in FIG. 10 by channels 302', 304' and 306'.

The third mode is a reversible mode in which the asymmetrical transmission of data and other information is carried out in the same manner as conventional ADSL shown in FIG. 4, but the direction of flow is selectively reversed so that the upstream direction becomes the downstream direction and vice versa. This mode is especially useful for applications in which there are non-simultaneous, non-real time, exchanges of large amounts of information in both directions.

Figure 9:
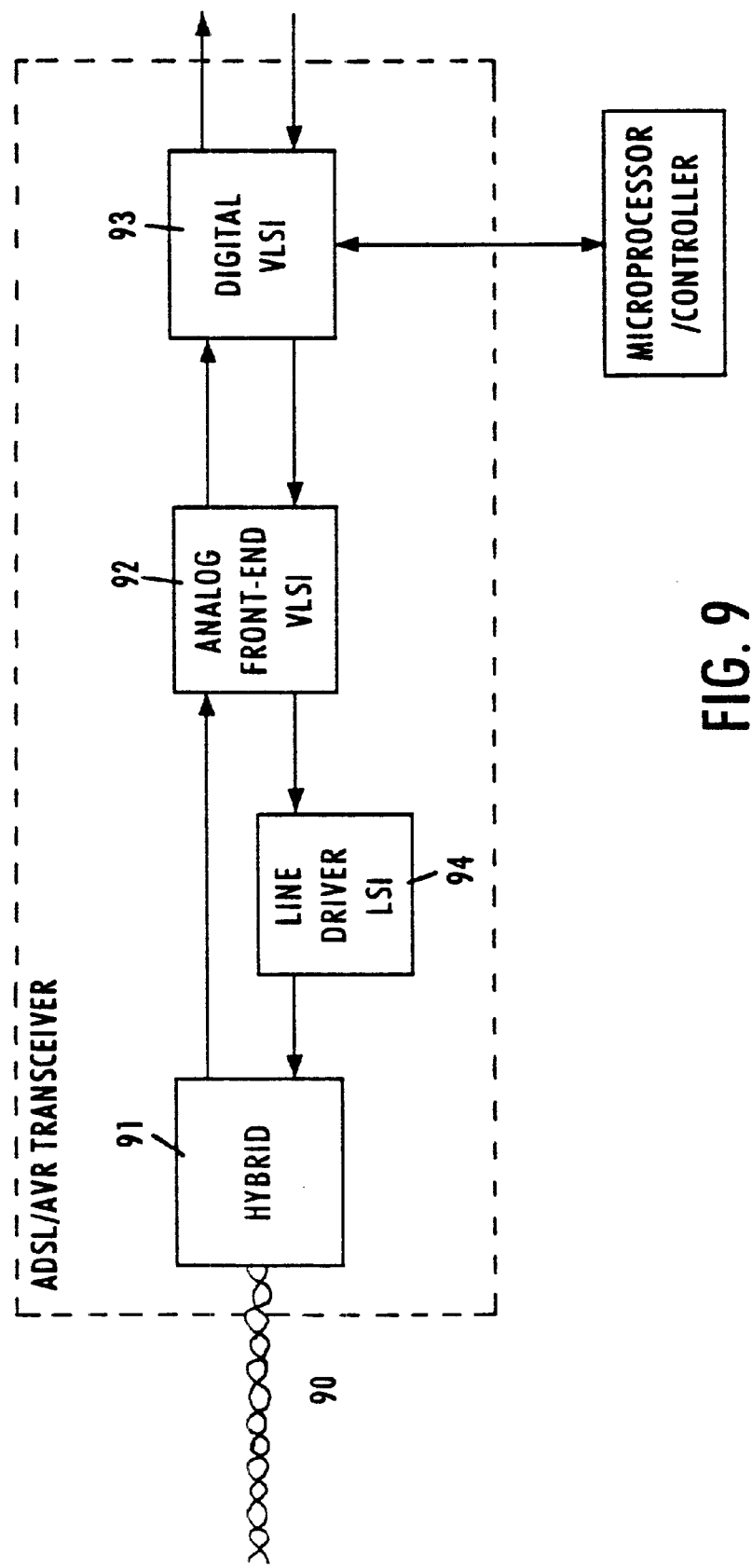
FIG. 9 is a block diagram of a preferred embodiment of the ADSL/AVR DMT transceiver used in the present invention.

FIG. 9 is a block diagram of the transceiver of each of the ADSL/AVRs used in the present invention. Hybrid circuit 91 interfaces with twisted copper pair 90 in both directions and outputs information over the copper pair when the transceiver is acting as a transmitter and inputs information received over the copper pair when the transceiver is acting as a receiver.

Information received by hybrid circuit 91 from copper loop pair 90 is forwarded to analog front-end circuit 92, preferably implemented as a very large scale integrated (VLSI) circuit, where it is filtered by an $R_x$ filter, corrected in an amplitude by an automatic gain control circuit and converted into digital form by an analog-to-digital converter. The digital information is outputted from analog front-end circuit 92 and inputted into digital circuit 93, preferably implemented as a very large scale integrated circuit. The digital information is processed by a decision feedback equalizer and passes through a decision circuit and a symbol-to-bit map. The output of the symbol-to-bit map is descrambled in a descrambler and, if necessary, decoded and de-interleaved in a Reed-Solomon error correction circuit. The information received is then outputted at an output port by digital circuit 93 to connected digital equipment such as, for example, a personal computer (PC).

Digital information is transmitted by the transceiver in the following manner. The digital information is inputted to digital circuit 93 from an input port where, if necessary, it is encoded and interleaved by a Reed-Solomon Encoder for error correction in a manner previously known. The information is then scrambled, converted by a bit-to-symbol map, and then finally prepared for transmission by a CAP transmitter. The CAP transmitter is responsive to, and controlled by, the external microprocessor/controller described previously. The information is outputted from digital circuit 93 to analog front-end circuit 92, where it is converted to analog data by an analog-to-digital converter and then filtered by a $T_x$ filter. The analog information is forwarded to line driver circuitry 94, preferably implemented as a large scale integration (LSI) circuit, to be driven on the twisted copper pair through hybrid circuit 91.

The bandwidth range of the transmission carried out by the transmitter in digital circuit 93 is controlled by the external microprocessor/controller. In an asymmetrical mode, the two-way signalling channel is multiplexed and DMT (or CAP, QAM, DWMT, etc.) encoded and decoded onto and off of a certain part of the bandwidth and the data channel is DMT (or CAP, QAM, DWMT, etc.) encoded for downstream transmission in another part of the bandwidth range. The encoder/decoder in the digital circuit may controllably transmit and receive over, in effect, the entire range, and use the range in different ways. Conventional ADSL has three different predefined spectrums as described previously. The firmware in the microprocessor/controller can enable the ADSL/AVR transceiver to transmit and receive anywhere in the spectrum and decide which of the discrete tones should be used to respectively represent downstream, upstream, signaling and broadband channels. The range of the spectrum can be set so that it is possible to get more bandwidth going upstream and less bandwidth going downstream.

This capability to manipulate the bandwidth range opens up possibilities to obtain transmission rates greater than the DS-1 (1.544 Mbps) rate typically used in ADSL systems. An ADSL/AVR transceiver operating in an asymmetrical mode may be able to reliably transmit two DS-1 channels (3.1 Mbps) or a DS-2 channel (6.2 Mbps). The transmission rate will be limited primarily by distance depending on the characteristics of the copper wire pair carrying the transmission. If the distance in the loop exceeds the capability of the ADSL/AVR transceiver in a particular installation, a high speed backbone can be run and the ADSL/AVRs dynamically allocated to provide coverage. Each one of circuits 91, 92 and 93 is preferably implemented as a single integrated circuit chip in a chip set.

The structure of the chips in the chip set does not need to be changed to vary the mode of the transceiver or the transmission rates. Instead, the transceiver may be given another set of program guides telling it how to reallocate the spectrum. Consequently, the same chip set is preferably used at both ends of DMT transmission: the subscriber and the CO. In CAP technology, the transceiver at the CO is much simpler than the receiver at the subscriber's location.

The use of a single chip set, capable of either transmitting or receiving conventional ADSL, at both ends of the transmission loop in the ADSL/AVR system shown in FIGS. 7 and 9 make it possible to easily and selectively implement the reversable ADSL mode mentioned previously. When in the reversible ADSL mode, one of the ADSL/AVR transceivers transmits over the same channels shown in FIG. 4 in the same manner as the CO-side ADSL unit in conventional ADSL. The other ADSL/AVR transceiver receives the same channels in the same manner as the subscriber-side ADSL unit in conventional ADSL. However, unlike conventional ADSL, the asymmetrical flow of data direction may be selectively reversed during a communication session by transferring appropriate OAM&P data over the control channel so that the CO-side ADSL unit becomes the subscriber-side ADSL unit and vice versa.

Moreover, the external microprocessor/controller enables the rate or mode of the ADSL/AVR to be selected in any one of a number of ways during a communication session. For example, the selection of modes for transmission can be controlled directly by the subscriber through, for example, a switch or button on the ADSL/AVR interface. The selection and control of the mode in the ADSL/AVR system may also be controlled by making a selection on a set-top box or transmitting a mode control signal from a PC connected to the ADSL/AVR interface. The system can also bypass the set top in the bi-directional mode to the PC.

When a request for a change in modes (e.g., from ADSL to bi-directional) is received during or prior to a communication session, a negotiation is made between the two ADSL/AVR boxes so that they are operating in a compatible mode within a short period of time. A menu may be displayed at the subscriber end which queries for desired parameters such as the desired mode and/or data rate. The subscriber then selects the desired data rate, or indicates transmission at a variable rate, through software or through the selection of buttons on the set top box. Once the data rate is designated, the level 1 gateway and the network controller then set the cross-connect switches so that there are some dedicated paths from the LAN back to the DCS and to the subscriber. The network can be either the X.25 network or the ATM network using an ATM edge device.

The changes in mode and rate for the channel can be accomplished by the ADSL/AVR interface in the subscriber's premises. Any intra-session change should be accomplished within 10 seconds and, preferably, within two seconds so that the subscriber does not experience a long delay between mode or rate changes. Once the mode and rate has been set by the communicating ADSL/AVRs, the subscriber may utilize the channel in any one of a number of ways. For example, the single channel provided by the subscriber ADSL/AVR may be used to access and transmit a number of files simultaneously, which are then split off in the subscriber's premises to, for example, different personal computers or to a television set and a personal computer. Alternatively, a fractional T1 interface and control software could be used at the subscriber end to provide separate multiplexed carriers or channels of up to 24 DS-0's on a regular trunk.

In addition to the direct subscriber selection or control of modes during a communication session mentioned above, the selection of modes may also be made indirectly, programmed or otherwise controlled so that it is executed upon the performance of some event.

For example, a subscriber may be working in the bi-directional mode and request that a LAN or other file server perform a search for files or other information and download said files or information once they are located. Although the downloading should be carried out in the ADSL mode if it is a video, graphics, or other file containing a large amount of information, the search may take a long period of time and it would not be efficient to change from bi-directional mode to ADSL mode at the time the search is requested. Therefore, the subscriber would not directly request that the system mode be changed. Rather, the subscriber would instruct the LAN or file server to automatically change the system from bi-directional mode to ADSL mode only after the search has been completed and then download the file or other information.

Alternatively, the subscriber could instruct the LAN or file server to utilize a command file to change the mode and download the file or information upon the occurrence of some detectable event or at a designated time. The subscriber could also instruct the LAN or file server to indicate when it has completed the search and is ready to download the file in the form of a video program to a set top box or an e-mail to a PC. The subscriber could then make a direct request for an ADSL mode change at his or her convenience.

The ADSL/AVR thus effectively functions as a variable rate/variable mode modem, at a much higher rate capability than voiceband modems, wireless cellular service or ISDN. The ADSL/AVR service can be changed over a range from conventional ADSL to full AVR functionality at any time during a transmission session. A subscriber thus can access any file server, download files, store information, and perform any other functions permitted in the optimum mode and at the optimum rate for that function. This capability in turn allows an interactive multimedia network over copper with wide band to narrow band interactive multimedia.

The configuration of the ADSL/AVR system in the preferred embodiment also makes it possible to instruct a LAN or file server to download the file or other information at a location other than the one at which the instruction is given, including turning on the PC or set top box if necessary, or to carry out broadcast or multicast communications. The use of identical ADSL/AVR interfaces at the CO and at subscriber locations also makes it possible to set up and accomplish two-way subscriber-to-subscriber communication of, for example, video information over common copper telephone lines, depending on the length and characteristics of the line.

Previous video services only provided downstream video asymmetrically from a Video Information Provider (VIP) to a subscriber using a level 2 gateway to receive a ringing signal or an instruction from a subscriber in a video dial tone network and execute call connection using the network controller and level 1 gateway. With the use of variable rate/variable mode ADSL/AVRs, video data which is pre-recorded in a compressed format or passed through a compression circuit can be sent to or from subscriber locations. This operation would enable a subscriber at one location to, for example, send a live camcorder feed to another subscriber over the public switched telephone network.

The ADSL/AVR network may also approach full service by adding at each location a network interface module (NIM). The NIM would enable access to a number of formats, including broadband ATM, frame relay, SMDS, BBT, 27 MHz HFC or transmission control protocol/internet protocol (TCPIP) and the ADSL/AVR interface would enable the network to extend over the copper loop.

The NIM could process information without a PC and input and output information as desired. The NIM could also have a number of associated input and output devices. For example, it may include voice recognition capability to support voice recognition security functions and voice selection of files. It may also have an input device for inputting identifying information such as, for example, a card reader for reading a credit card or debit card and output device for printing a receipt in real time in a home shopping service. The receipt would preferably include encrypted information confirming the transaction. Of course, the same service provided by a NIM may be accomplished by connecting to a LAN using a set top box or a PC and accompanying peripherals.

Depending on the type of network, ADSL/AVR interfaces are used to extend the network over existing copper telephone lines. For example, if the network is a full service BBT network, then data initially received at the set top or other subscriber equipment can be transferred through an ADSL/AVR interface to a subsequent user over the phone lines.

Figure 2:
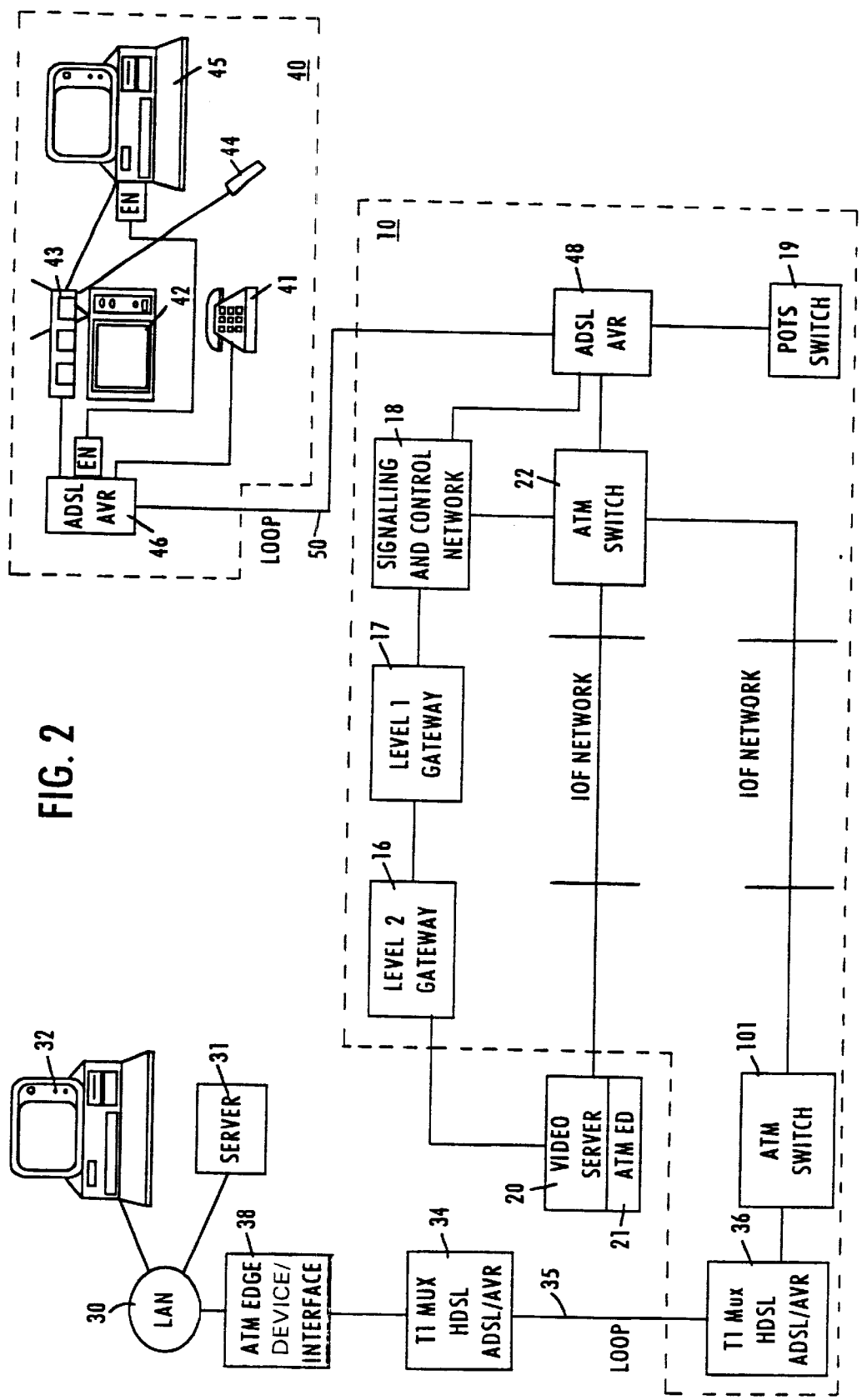
FIG. 2 is a system diagram of a second embodiment of the invention showing connection between a video server/ATM Edge device and a single subscriber through an ATM switch and two ADSL/AVRs.

FIG. 2 illustrates the use of the present invention in an asynchronous transfer mode (ATM) network. ATM networks packetize and transfer data through the use of packets which contain addressing and other overhead bits as well as data bits. Such networks have an inherent asynchronous capacity as ATM switches can effectively function as variable bit rate switches. ATM networks are therefore especially well suited for use with variable rate/variable mode ADSL/AVR's.

The ATM embodiment of the invention shown in FIG. 2 replaces the digital cross connect switches used in the embodiment shown in FIG. 1 with a plurality of ATM switches 22 101 and an ATM edge device 21 in front of each video server. An appropriate ATM controller (not shown) replaces network controller 11 in FIG. 1 and is used to control the ATM network. All ADSL/AVR transmission, including signaling and control channels, is handled by the ATM network. The features of the ATM switch can be used for both data and video.

In a video-on-demand service utilizing the network shown in FIG. 2, MPEG encoded video from video server 20 is captured and packetized using ATM edge device 21. The packetized information is then transferred over the IOF network to ATM switch 22 where it is subsequently routed to ADSL/AVR interface 18. The ATM overhead may be stripped off in an ATM Edge device (not shown), the data put back in MPEG format and the MPEG format data may be transferred to subscriber's premises 40 over the loop using the ADSL/AVR interface in the manner previously described. Alternatively, the ATM formatted video may be delivered to settop box 43 with the ATM overhead left intact. The settop box then strips off the overhead and decodes the MPEG format data.

Set top box 43 would preferably contain a PCMCIA slot and accept a PCMCIA card which provides an Ethernet interface for direct connection between set top box 43 and personal computer 45. The settop could also provide a dedicated ethernet port. A separate Ethernet interface may also be provided directly on ADSL/AVR interface 46 for direct connection to an Ethernet card in personal computer 45. An Ethernet Interface (not shown) may also be provided on central office ADSL/AVR interface 48 for connection to an internal local area network. In conjunction with the routers and bridges to the SMDS network 39 shown in FIG. 11, personal computer 45 may be connected to LAN server 31 through an Ethernet interface. The ADSL/AVR interface 46 preferably contains a toggle switch which controls the direction of incoming and outgoing signals to either the set top box 43 or personal computer 45 via the Ethernet interface. Although these Ethernet related features are especially advantageous when used in the ATM embodiment shown in FIG. 2, they may be used in the embodiment shown in FIG. 1 as well.

FIG. 2 is merely an exemplary preferred embodiment. In general, once a data or other signal gets to the ATM network from a subscriber or other network via ADSL/AVR interfaces, the signal can be captured and packetized using an ATM edge device and subsequently routed to any number of ATM switches without using digital cross connect switches and without constant bit rates. A network controller can be used in a manner similar to the first embodiment to set up virtual paths for the virtual circuits. ATM routing may be used in any number of configurations to transport signals from ADSL/AVR interfaces to multiple LAN's or other networks, etc., by using an ATM edge device and interfacing with the LAN's or other networks through an ADSL/AVR interface and common telephone lines. The ADSL/AVR interfaces will compensate for the characteristics of the loop between the ATM network and the subscriber or between two subscribers.

Although the present invention has been described and illustrated in detail, it is clearly understood that the same is by way of illustration an example and is not to be taken by way of limitation, the spirit and scope of the present invention being limited only by terms of the appended claims.

What is claimed is:

1. A digital subscriber line (DSL) transmission system for variably transmitting information data in a plurality of different grades of service supported by a network, said transmission system comprising:
   a first transceiver, connected to an end of a subscriber loop, for selectively operating in one of a plurality of said grades of services, said first transceiver transmitting signals, at a first transmission rate, over a first range of frequencies, and receiving signals, at a second transmission rate, over a second range of frequencies, in each of said plurality of different grades of service;
   a second transceiver, connected to said first transceiver via said subscriber loop, for selectively operating in one of said plurality of different grades of service, said second transceiver receiving signals at said first transmission rate over said first range of frequencies, and transmitting signals at said second transmission rate on said second range of frequencies; and
   a controller connected to said first transceiver for selectively changing grade of service by changing said first transmission rate, said second transmission rate, or both.

2. A transmission system as recited in claim 1, wherein said first range of frequencies is completely separate from said second range of frequencies.

3. A transmission system as recited in claim 1, wherein said second range of frequencies is subsumed within or coincident with said first range of frequencies.

4. A transmission system as recited in claim 1, wherein said controller includes the ability to control said first and second transmission rates in accordance with an algorithm which determines an optimum transmission rate.

5. The transmission system of claim 1, wherein said subscriber loop is a wired DSL loop.

6. The transmission system of claim 1, wherein said subscriber loop is a wired ADSL loop.

7. A transmission system as recited in claim 1, wherein said plurality of different grades of service includes at least one grade of service in which the downstream and upstream transmission rates are approximately equivalent to one another.

8. A transmission system as recited in claim 1, wherein said plurality of different grades of service includes more than one grade of service in which the downstream and upstream transmission rates are approximately equivalent to one another.

9. The transmission system of claim 1, wherein said plurality of different grades of service includes at least one grade of service wherein the downstream transmission rate exceeds the upstream transmission rate.

10. The transmission system of claim 1, wherein said plurality of different grades of service includes more than one grade of service wherein the downstream transmission rate exceeds the upstream transmission rate.

11. The transmission system of claim 1, wherein said plurality of different grades of service includes at least one grade of service wherein the upstream transmission rate exceeds the downstream transmission rate.

12. The transmission system of claim 1, wherein said plurality of different grades of service includes more than one grade of service wherein the upstream transmission rate exceeds the downstream transmission rate.

13. The transmission system of claim 1, wherein said plurality of different grades of service includes at least one grade of service wherein the downstream and upstream transmission rates are approximately equivalent, at least one grade of service wherein the upstream transmission rate exceeds the downstream transmission rate, and at least one grade of service wherein the downstream transmission rate exceeds the upstream transmission rate.

14. The transmission system of claim 1, wherein a change between grades of service is accomplished by changing the bandwidth of the first range of frequencies, the second range of frequencies, or both.

15. The transmission system of claim 14, wherein said change between grades of service includes reallocating or reassigning a portion of the bandwidth previously associated with the first range of frequencies to the second range of frequencies.

16. The transmission system of claim 14, wherein said change between grades of service includes reallocating or reassigning a portion of the bandwidth previously associated with the first range of frequencies to the second range of frequencies.

17. A transmission system as recited in claim 1, wherein said first and second transceivers are comprised of discrete multi-tone transceivers.

18. A digital subscriber line (DSL) transmission system for variably transmitting information data in a plurality of different grades of service supported by a network, said transmission system comprising:
   a first transceiver, connected to an end of a subscriber loop, for selectively operating in one of a plurality of said grades of services, said first transceiver transmitting signals, at a first transmission rate, over a first range of frequencies, and receiving signals, at a second transmission rate, over a second range of frequencies, in each of said plurality of different grades of service;
   a second transceiver, connected to said first transceiver via said subscriber loop, for selectively operating in one of said plurality of different grades of service, said second transceiver receiving signals at said first transmission rate over said first range of frequencies, and transmitting signals at said second transmission rate on said second range of frequencies; and
   a controller connected to said first transceiver for selectively changing grade of service by changing said first transmission rate, said second transmission rate, or both,
   wherein said plurality of different grades of service includes at least one grade of service wherein the upstream transmission rate, the downstream transmission rate, or both, are less than the maximum rates which may be supported over said subscriber loop based on characteristics of said subscriber loop.

19. A transmission system as recited in claim 18, wherein said network comprises a public switched telephone network and wherein said system reserves for audio telephone signals a third range of frequencies in association with each of said plurality of grades of service, said third range of frequencies being completely separate from said first and second ranges of frequencies.

20. A transmission system as recited in claim 18, wherein said local subscriber loops comprise twisted copper wire pairs.

21. A transmission system as recited in claim 18, wherein said controller controls said first and second transmission rates in accordance with a selection made by an operator.

22. A transmission system as recited in claim 21, wherein said operator makes said selection in response to a preference communicated by the end-user of data transmission services provided over said transmission system.

23. A digital subscriber line (DSL) transmission system for variably transmitting information data in a plurality of different grades of service supported by a network, said transmission system comprising:

a first transceiver, connected to an end of a subscriber loop, for selectively operating in one of a plurality of said grades of services, said first transceiver transmitting signals, at a first transmission rate, over a first range of frequencies, and receiving signals, at a second transmission rate, over a second range of frequencies, in each of said plurality of different grades of service;

a second transceiver, connected to said first transceiver via said subscriber loop, for selectively operating in one of said plurality of different grades of service, said second transceiver receiving signals at said first transmission rate over said first range of frequencies, and transmitting signals at said second transmission rate on said second range of frequencies; and a controller connected to said first transceiver for selectively changing said grades of service by changing said first transmission rate, said second transmission rate, or both; wherein:

said controller controls said first and second transmission rates in accordance with a selection made by the end-user of data transmission services provided over said transmission system;

said plurality of different grades of service includes at least one grade of service wherein the upstream transmission rate, the downstream transmission rate, or both, are less than the maximum rates which may be supported over said subscriber loop based on characteristics of said subscriber loop;

said plurality of different grades of service includes more than one grade of service wherein the downstream transmission rate exceeds the upstream transmission rate said first range of frequencies is completely separate from said second range of frequencies; and said local subscriber loop comprises twisted copper wire pairs.

24. The transmission system of claim 23, wherein said first and said second transceivers are discrete multi-tone (DMT) transceivers.

25. A digital subscriber line (DSL) transmission system for variably transmitting information data in a plurality of different grades of service supported by a network, said transmission system comprising:

a first transceiver, connected to an end of a subscriber loop, for selectively operating in one of a plurality of said grades of services, said first transceiver transmitting signals, at a first transmission rate, over a first range of frequencies, and receiving signals, at a second transmission rate, over a second range of frequencies, in each of said plurality of different grades of service;

a second transceiver, connected to said first transceiver via said subscriber loop, for selectively operating in one of said plurality of different grades of service, said second transceiver receiving signals at said first transmission rate over said first range of frequencies, and transmitting signals at said second transmission rate on said second range of frequencies; and a controller connected to said first transceiver for selectively changing said grades of service by changing said first transmission rate, said second transmission rate, or both; wherein:

said controller controls said first and second transmission rates in accordance with a selection made by the end-user of data transmission services provided over said transmission system;

said plurality of different grades of service includes at least one grade of service wherein the upstream transmission rate, the downstream transmission rate, or both, are less than the maximum rates which may be supported over said subscriber loop based on characteristics of said subscriber loop;

said plurality of different grades of service includes more than one grade of service in which the downstream and upstream transmission rates are approximately equivalent to one another;

said second range of frequencies is coincident with said first range of frequencies; and said local subscriber loops comprise twisted copper wire pairs.

26. The transmission system of claim 25, wherein said first and said second transceivers transmit information using 2B1Q line encoding.

27. A transmission system for providing a plurality of digital subscriber line service offerings, each service offering being defined by its upstream and downstream transmission rates, said transmission system comprising:

a first transceiver, electrically connected to a first end of a subscriber loop, for selectively operating in accord with one of a plurality of said service offerings, said first transceiver transmitting signals at a first transmission rate in the downstream direction, and receiving signals at a second transmission rate in the upstream direction, in accord with each of the plurality of service offerings;

a second transceiver, electrically connected to a second end of said subscriber loop and to said first transceiver via said subscriber loop, for selectively operating in accord with one of said plurality of service offerings, said second transceiver receiving signals at said first transmission rate in the downstream direction, and transmitting signals at said second transmission rate in the upstream direction; and at least one controller electrically connected to or associated with said first and said second transceivers for changing the service offering provided by the transmission system.

28. A transmission system as recited in claim 27, wherein changes in the transmission rates are effected by changing bandwidth of frequencies assigned to the upstream direction, the downstream direction, or both.

29. A transmission system as recited in claim 27, wherein changes to the service offering are made in accordance with preferences expressed by an end-user.

30. The transmission system as recited in claim 27, including the ability to change from one service offering wherein the downstream transmission rate is greater than the upstream transmission rate to another service offering wherein the possibly different downstream transmission rate is still greater than the possibly different upstream transmission rate.

31. The transmission system as recited in claim 27, including the ability to change from one service offering wherein the downstream and upstream transmission rates are roughly equivalent to one another, to another service offering wherein the downstream and upstream transmission rates have both changed, but are still roughly equivalent to one another.

32. A transmission system as recited in claim 27, wherein changes to the service offering occur without breaking the communications link to the end-user.

33. A transmission system as recited in claim 27, wherein a break in the communications link to the end-user is effected as a result of or coincident with a change to the service offering.

34. A transmission system as recited in claim 33, wherein said break in said communications link to said end-user lasts for approximately 10 seconds or less.

35. A digital subscriber line (DSL) transmission system for transmitting information at various selectable transmission rates, comprising:
   a first transceiver, electrically connected to a first end of a subscriber loop, for transmitting signals at a first transmission rate in the downstream direction, and receiving signals at a second transmission rate in the upstream direction;
   a second transceiver, electrically connected to a second end of a subscriber loop, for receiving signals at said first transmission rate in the downstream direction, and transmitting signals at said second transmission rate in the upstream direction; and
   at least one controller electrically connected to or associated with either one or both of said first and second transceivers for setting the upstream and downstream transmission rates.

36. A DSL transmission system as recited in claim 35, wherein the upstream transmission rate is set by selecting from a set of available upstream transmission rates and the downstream transmission rate is set by selecting from a set of available downstream transmission rates.

37. A DSL transmission system as recited in claim 36, wherein the downstream transmission rate may be set either higher than, roughly equivalent to, or lower than the upstream transmission rate.

38. A DSL transmission system as recited in claim 37, wherein the upstream transmission rate, the downstream transmission rate, or both, after having been set, may be reset to any other of said available transmission rates.

39. A DSL transmission system as recited in claim 38, wherein the downstream transmission rate, having been set higher than the upstream transmission rate, may be reset to another of said available downstream transmission rates, while still being higher than the upstream transmission rate.

40. A DSL transmission system as recited in claim 38, wherein the upstream and downstream transmission rates, having been set roughly equivalent to one another, may each be reset to another of said available (upstream and downstream) transmission rates, while still being roughly equivalent.

41. A DSL transmission system as recited in claim 38, wherein the upstream and downstream transmission rates, after having been set, may be reset based on preferences expressed by an end-user of said transmission system.

42. A DSL transmission system as recited in claim 38, wherein the upstream transmission rate, the downstream transmission rate, or both, may be automatically reset in response to the occurrence of a pre-programmed event.

43. A DSL transmission system as recited in claim 38, wherein the upstream transmission rate, the downstream transmission rate, or both, may be automatically reset to the lesser of said initially set rates and the maximum data rates supported by transmission line characteristics.

44. A DSL transmission system as recited in claim 38, wherein the upstream transmission rate, the downstream transmission rate, or both, may be reset directly by the end-user of the DSL transmission system.

45. A DSL transmission system as recited in claim 44, wherein the end-user of the DSL transmissions system may reset the upstream transmission rate, the downstream transmission rate, or both, via a set-top box electrically connected to the DSL transmission system.

46. A DSL transmission system as recited in claim 44, wherein the end-user of the DSL transmissions system may reset the upstream transmission rate, the downstream transmission rate, or both, via the issuance of a signal from a PC electrically connected to the DSL transmission system.

47. A DSL transmission system as recited in claim 38, wherein the bandwidth over which occur transmissions in the downstream direction is completely isolated in frequency from the bandwidth over which occur transmissions in the upstream direction.

48. A DSL transmission system as recited in claim 38, wherein the bandwidth over which occur transmissions in the downstream direction partially overlaps in frequency the bandwidth over which occur transmissions in the upstream direction.

49. A DSL transmission system as recited in claim 38, wherein the bandwidth over which occur transmissions in the downstream direction is coincident in frequency with the bandwidth over which occur transmissions in the upstream direction.

50. A digital subscriber line (DSL) transmission system for transmitting information at various selectable transmission rates, comprising:
   a first transceiver, electrically connected to a first end of a subscriber loop, for transmitting signals at a first transmission rate in the downstream direction, and receiving signals at a second transmission rate in the upstream direction;
   a second transceiver, electrically connected to a second end of a subscriber loop, for receiving signals at said first transmission rate in the downstream direction, and transmitting signals at said second transmission rate in the upstream direction; and
   at least one controller electrically connected to or associated with either one or both of said first and second transceivers for setting the upstream and downstream transmission rates, wherein:
      the upstream transmission rate is set by selecting from a set of available upstream transmission rates and the downstream transmission rate is set by selecting from a set of available downstream transmission rates,
      the downstream transmission rate may be set either higher than, roughly equivalent to, or lower than the upstream transmission rate,
      the upstream transmission rate, the downstream transmission rate, or both, after having been set, may be reset to any other of said available (upstream and downstream) transmission rates,
      the downstream transmission rate, having been set higher than the upstream transmission rate, may be reset to another of said available downstream transmission rates, while still being higher than the upstream transmission rate, and
      the bandwidth over which occur transmissions in the downstream direction is either completely isolated in frequency from the bandwidth over which occur transmissions in the upstream direction, partially overlaps in frequency the bandwidth over which occur transmissions in the upstream direction, or is coincident in frequency with the bandwidth over which occur transmissions in the upstream direction.

51. A digital subscriber line (DSL) transmission system for transmitting information at various selectable transmission rates, comprising:
- a first transceiver, electrically connected to a first end of a subscriber loop, for transmitting signals at a first transmission rate in the downstream direction, and receiving signals at a second transmission rate in the upstream direction;
- a second transceiver, electrically connected to a second end of a subscriber loop, for receiving signals at said first transmission rate in the downstream direction, and transmitting signals at said second transmission rate in the upstream direction; and
- at least one controller electrically connected to or associated with either one or both of said first and second transceivers for setting the upstream and downstream transmission rates, wherein:
  - the upstream transmission rate is set by selecting from a set of available upstream transmission rates and the downstream transmission rate is set by selecting from a set of available downstream transmission rates,
  - the downstream transmission rate may be set either higher than, roughly equivalent to, or lower than the upstream transmission rate,
  - the upstream transmission rate, the downstream transmission rate, or both, after having been set, may be reset to any other of said available (upstream and downstream) transmission rates,
  - the downstream and upstream transmission rates, having been set roughly equivalent to one another, may both be reset to another of said available (downstream and upstream) transmission rates, while still being roughly equivalent to one another, and
  - the bandwidth over which occur transmissions in the downstream direction is either completely isolated in frequency from the bandwidth over which occur transmissions in the upstream, direction, partially overlaps in frequency the bandwidth over which occur transmissions in the upstream direction, or is coincident in frequency with the bandwidth over which occur transmissions in the upstream direction.

52. A digital subscriber line (DSL) transmission system for transmitting information at various selectable transmission rates, comprising:
- a first DSL modem or line-card, electrically connected to the central-office (CO) end of a subscriber loop, for transmitting signals at a first transmission rate in the downstream direction, and receiving signals at a second transmission rate in the upstream direction;
- a second DSL modem or line-card, electrically connected to the consumer premise end of a subscriber loop, for receiving signals at said first transmission rate in the downstream direction, and transmitting signals at said second transmission rate in the upstream direction;
- at least one controller electrically connected to or associated with either one or both of said first DSL modem or line-card and said second DSL modem or line-card, for setting the upstream transmission rate, the downstream transmission rate, or both transmission rates.

53. A DSL transmission system as recited in claim 52, wherein the upstream transmission rate is set by selecting from a set of available upstream transmission rates and the downstream transmission rate is set by selecting from a set of available downstream transmission rates.

54. A DSL transmission system as recited in claim 53, wherein the downstream transmission rate may be set either higher than, roughly equivalent to, or lower than the upstream transmission rate.

55. A DSL transmission system as recited in claim 54, wherein the upstream transmission rate, the downstream transmission rate, or both, after having been set, may be reset to any other of said available transmission rates.

56. A DSL transmission system as recited in claim 55, wherein the downstream transmission rate, having been set higher than the upstream transmission rate, may be reset to another of said available downstream transmission rates, while still being higher than the upstream transmission rate.

57. A DSL transmission system as recited in claim 55, wherein the upstream and downstream transmission rates, having been set roughly equivalent to one another, may each be reset to another of said available (upstream and downstream) transmission rates, while still being roughly equivalent.

58. A DSL transmission system as recited in claim 55, wherein the upstream and downstream transmission rates, after having been set, may be reset based on preferences expressed by an end-user of said transmission system.

59. A DSL transmission system as recited in claim 55, wherein the upstream transmission rate, the downstream transmission rate, or both, may be automatically reset in response to the occurrence of a pre-programmed event.

60. A DSL transmission system as recited in claim 55, wherein the upstream transmission rate, the downstream transmission rate, or both, may be automatically reset to the lesser of said initially set rates and the maximum data rates supported by transmission line characteristics.

61. A DSL transmission system as recited in claim 55, wherein the bandwidth over which occur transmissions in the downstream direction is completely isolated in frequency from the bandwidth over which occur transmissions in the upstream direction.

62. A DSL transmission system as recited in claim 55, wherein the bandwidth over which occur transmissions in the downstream direction partially overlaps in frequency the bandwidth over which occur transmissions in the upstream direction.

63. A DSL transmission system as recited in claim 55, wherein the bandwidth over which occur transmissions in the downstream direction is coincident in frequency with the bandwidth over which occur transmissions in the upstream direction.

64. A method for transmitting information at various selectable transmission rates, over a digital subscriber line (DSL) transmission system comprising:
- electrically connecting a first transceiver to a first end of a subscriber loop and a second transceiver to a second end of a subscriber loop;
- controlling at least one of said first and second transceivers for setting a first transmission rate and a second transmission rate;
- transmitting signals at the first transmission rate in the downstream direction, between said first and second transceivers;
- transmitting signals at the second transmission rate in the upstream direction between said first and second transceivers;
- controlling at least one of said first and second transceivers for selectively changing at least one of said upstream transmission rate and said downstream transmission rate.

65. The method of claim 64, wherein said at least one of said upstream transmission rate and said downstream transmission rate are selective changed by manipulating the bandwidth over which occur transmission in said downstream and said upstream directions.

66. The method of claim 64, wherein said at least one of said upstream transmission rate and said downstream transmission rate are selectively changed by manipulation of constellation rates, or bit-stuffing.

67. A DSL transmission system for variably transmitting information data, comprising:
- a first DSL transceiver for transmitting signals in the downstream direction at a first transmission rate, and receiving signals in the upstream direction at a second transmission rate;
- a second DSL transceiver for receiving signals at said first transmission rate in said downstream direction, and transmitting signals at said second transmission rate in said upstream direction; and
- a twisted wire pair telephone line for connecting said first and second transceivers together;
- wherein each of said first transceiver, said second transceiver, or both, includes a controller for selectively changing the transmission rates in either one or both of said upstream and said downstream directions.

68. The transmission system of claim 67, wherein the frequency range utilized for the transmission of information in said downstream direction is isolated from the frequency range utilized for the transmission of information in said upstream direction.

69. The transmission system of claim 67, wherein the frequency range utilized for the transmission of information in said downstream direction overlaps the frequency range utilized for the transmission of information in said upstream direction.

70. The transmission system of claim 67, wherein the frequency range utilized for the transmission of information in said downstream direction is the same as the frequency range utilized for the transmission of information in said upstream direction.

71. In a digital subscriber loop (DSL) transmission system for variably transmitting information data in a plurality of different grades of service, said DSL transmission system comprising: a first transceiver for transmitting signals at a first transmission rate in a downstream direction, and receiving signals at a second transmission rate in an upstream direction, a second transceiver for receiving signals at said first transmission rate in said downstream direction, and transmitting signals at said second transmission rate in said upstream direction, and a subscriber loop for connecting said first and second transceivers together, a method comprising the steps of:
- assigning a first transmission rate to transmissions in the downstream direction;
- assigning a second transmission rate to transmissions in the downstream direction; and
- in response to a preference expressed by an end-user of said DSL transmission system, and without replacing said first transceiver or said second transceiver, altering the first transmission rate, the second transmission rate, or both, to vary the information data transmission rates in the upstream direction, the downstream direction, or both.

72. A digital subscriber line (DSL) transmission system for variably transmitting information data in a plurality of different grades of service supported by a network, said transmission system comprising:
- a first transceiver, connected to an end of a subscriber loop, for selectively operating in one of a plurality of said grades of services, said first transceiver transmitting signals, at a first transmission rate, over a first range of frequencies, and receiving signals, at a second transmission rate, over a second range of frequencies in each of said plurality of different grades of service;
- a second transceiver, connected to said first transceiver via said subscriber loop, for selectively operating in one of said plurality of different grades of service, said second transceiver receiving signals at said first transmission rate over said first range of frequencies, and transmitting signals at said second transmission rate on said second range of frequencies; and
- a controller connected to said first transceiver for selectively changing grade of service,
- wherein, so as to achieve the change of the grade of service, the controller is capable of selecting among: (1) changing the first transmission rate only, (2) changing the second transmission rate only, and (3) changing both the first transmission rate and the second transmission rate.

73. A transmission system for providing a plurality of digital subscriber line service offerings, each service offering being defined by its upstream and downstream transmission rates, said transmission system comprising:
- a first transceiver, electrically connected to a first end of a subscriber loop, for selectively operating in accord with one of a plurality of said service offerings, said first transceiver transmitting signals at a first transmission rate in the downstream direction, and receiving signals at a second transmission rate in the upstream direction, in accord with each of the plurality of service offerings;
- a second transceiver, electrically connected to a second end of said subscriber loop and to said first transceiver via said subscriber loop, for selectively operating in accord with one of said plurality of service offerings, said second transceiver receiving signals at said first transmission rate in the downstream direction, and transmitting signals at said second transmission rate in the upstream direction; and
- at least one controller electrically connected to or associated with said first and said second transceivers for changing the service offering provided by the transmission system,
- wherein, so as to achieve the change of the service offering, the controller is capable of selecting among: (1) changing the first transmission rate only, (2) changing the second transmission rate only, and (3) changing both the first transmission rate and the second transmission rate.

74. A digital subscriber line (DSL) transmission system for transmitting information at various selectable transmission rates, comprising:
- a first transceiver, electrically connected to a first end of a subscriber loop, for transmitting signals at a first transmission rate in the downstream direction, and receiving signals at a second transmission rate in the upstream direction;
- a second transceiver, electrically connected to a second end of a subscriber loop, for receiving signals at said first transmission rate in the downstream direction, and transmitting signals at said second transmission rate in the upstream direction; and
- at least one controller, electrically connected to or associated with either one or both of said first and second transceivers, for setting the upstream and downstream transmission rates and for resetting the upstream transmission rate, the downstream transmission rate, or both.

75. A digital subscriber line (DSL) transmission system for transmitting information at various selectable transmission rates, comprising:

a first DSL modem or line-card, electrically connected to the central-office (CO) end of a subscriber loop, for transmitting signals at a first transmission rate in the downstream direction, and receiving signals at a second transmission rate in the upstream direction;

a second DSL modem or line-card, electrically connected to the consumer premise end of a subscriber loop, for receiving signals at said first transmission rate in the downstream direction, and transmitting signals at said second transmission rate in the upstream direction;

at least one controller electrically connected to or associated with either one or both of said first DSL modem or line-card and said second DSL modem or line-card, having the capability for independently setting the upstream transmission rate, having the capability for independently setting the downstream transmission rate, and having the capability for setting both transmission rates.

76. A method for transmitting information at various selectable transmission rates, over a digital subscriber line (DSL) transmission system comprising:

electrically connecting a first transceiver to a first end of a subscriber loop and a second transceiver to a second end of a subscriber loop;

controlling at least one of said first and second transceivers for setting a first transmission rate and a second transmission rate;

transmitting signals at the first transmission rate in the downstream direction, between said first and second transceivers;

transmitting signals at the second transmission rate in the upstream direction between said first and second transceivers;

controlling at least one of said first and second transceivers for selectively changing either one or both of said upstream transmission rate and said downstream transmission rate.

77. A DSL transmission system for variably transmitting information data, comprising:

a first DSL transceiver for transmitting signals in the downstream direction at a first transmission rate, and receiving signals in the upstream direction at a second transmission rate;

a second DSL transceiver for receiving signals at said first transmission rate in said downstream direction, and transmitting signals at said second transmission rate in said upstream direction; and a twisted wire pair telephone line for connecting said first and second transceivers together;

wherein each of said first transceiver, said second transceiver, or both, includes a controller for selectively changing the transmission rates in either one or both of said upstream and said downstream directions.

\* \* \* \* \*